United States Patent [19]
Sonoda

[11] Patent Number: 6,075,823
[45] Date of Patent: *Jun. 13, 2000

[54] APPARATUS AND METHOD OF ACHIEVING IMPROVED DIVERSITY RECEPTION IN A DIGITAL RADIO COMMUNICATIONS SYSTEM

[75] Inventor: Hideaki Sonoda, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/838,689

[22] Filed: Apr. 9, 1997

[51] Int. Cl.$^7$ ..................................................... H04B 7/02
[52] U.S. Cl. ........................ 375/267; 375/214; 375/232; 375/346; 375/347
[58] Field of Search ..................................... 375/346, 347, 375/267, 214, 232; 455/135, 296; 329/306, 304

[56] References Cited

U.S. PATENT DOCUMENTS

| | | | |
|---|---|---|---|
| 4,701,935 | 10/1987 | Namiki | 375/214 |
| 5,119,401 | 6/1992 | Tsujimoto | 375/14 |
| 5,140,615 | 8/1992 | Jasper et al. | 375/100 |
| 5,361,404 | 11/1994 | Dent | 455/135 |
| 5,524,023 | 6/1996 | Tsujimoto | 375/232 |
| 5,524,125 | 6/1996 | Tsujimoto | 375/347 |

FOREIGN PATENT DOCUMENTS

| | | |
|---|---|---|
| 0 687 076 | 12/1995 | European Pat. Off. |
| 60-074743 | 4/1985 | Japan. |
| 60-171839 | 9/1985 | Japan. |
| 4-150320 | 5/1992 | Japan. |
| 5-336011 | 12/1993 | Japan. |

OTHER PUBLICATIONS

Tsujimoto, Ichiro "Cancellation of CW Interference by Decision Feedback Equalizer in Multipath Channel", Japanese Association of Electronics and Information, Spring Session, p. 2–418, 1992.

Tomiuk et al., "The Effect of Channel Weighting Errors in Maximal Ratio Combiners", Proceedings of the 29th Annual Conf. on Information Sciences and Systems, (1995).

*Primary Examiner*—Stephen Chin
*Assistant Examiner*—Shuwang Liu
*Attorney, Agent, or Firm*—Foley & Lardner

[57] ABSTRACT

A pilot signal is generated and added to a modulated carrier in a transmitter. The pilot signal is identical to an unmodulated carrier and has a level higher than a modulated signal to be transmitted. The pilot signal, transmitted together with the modulated carrier, is extracted at a diversity receiver and is correlated with the transmitted signals appearing at a plurality of diversity paths in the receiver in order to generate respective correlation coefficients. Subsequently, the received signals are respectively compensated for, using the correlation coefficients, in terms of levels and phases and then applied to a combiner. The pilot signal included in the output of the combiner is removed before the output of the maximum-ratio combiner is demodulated.

8 Claims, 5 Drawing Sheets

APPARATUS AND METHOD OF ACHIEVING IMPROVED DIVERSITY RECEPTION IN A DIGITAL RADIO COMMUNICATIONS SYSTEM

BACKGROUND OF THE INVENTION

1. Field of the Invention

The present invention relates generally to improvements in a radio communications system, and more specifically to an apparatus and operation method of implementing improved diversity reception using maximum-ratio combining techniques in a high-frequency digital radio communications system. The present invention is highly suited for being applied to digital line-of-sight microwave terminals merely by way of example.

2. Description of the Related Art

As is well known in the art, diversity reception is based on the fact that the radio signals arriving at a point of reception over separate paths may have non-correlated signal levels. More simply, at one instant of time a signal on one path may be in a condition of fade while the identical signal on another path may not.

Before turning to the present invention, it is deemed preferable to briefly describe, with reference to FIG. 1, a conventional diversity reception technique using a well-known technique of maximum-ratio combining.

FIG. 1 is a block diagram showing a conventional front section 8 of a diversity receiver, which section precedes a demodulator (not shown) provided for demodulating the output of the section 8.

As shown in FIG. 1, the front section 8 generally comprises two diversity paths 10a and 10b. The path 10a includes an antenna 12a, a down-converter 14a, a local oscillator 16a, a complex multiplier 18a, and a correlator 20a. In exactly the similar manner, the path 10b includes an antenna 12b, a down-converter 14b, a local oscillator 16b, a complex multiplier 18b, and a correlator 20b.

The antennas 12a and 12b receive respectively incoming signals over separate radio transmission paths. The down-converter 14a is supplied with the incoming signal from the antenna 12a and translates the frequency of the receive signal to a predetermined IF (intermediate frequency) signal using the local oscillator 16a. Likewise, the other down-converter 14b is supplied with the incoming signal from the antenna 12b and translates the frequency of the receive signal to the predetermined IF (intermediate frequency) signal using the local oscillator 16b. The output of the down-converter 14a is applied to the multiplier 18a and the correlator 20a, while the output of the other down-converter 14b is applied to the multiplier 18b and the correlator 20b.

The outputs of the multipliers 18a and 18b are combined at a combiner 22. Following this, the output of the combiner 22 is applied to an AGC (automatic gain controller) amplifier 24, the output of which is fed to the above mentioned correlators 20a and 20b and also applied to a DFE (decision feedback equalizer) 26. The equalized output of the DFE 26 is then demodulated at a demodulator (not shown) in a manner well known in the art. The DFE 26 operates such as to equalize waveform distortion caused by multipath fading induced during transmission. For further details of the DFE 26, reference should be made, for example, to U.S. Pat. No. 5,119,401 to Tsujimoto.

Designating the transmitted data (viz., symbol sequences), respectively derived from the down-converters 14a and 14b, as $r_n^1$ and $r_n^2$ (n=-00 . . . +00), the following equations are obtained. Throughout the instant disclosure the notation $\Sigma$ means summation from n=-00 to n=00.

$$r_n^1 = \Sigma h_i^1 a_{n-i} \quad (1)$$

$$r_n^2 = \Sigma h_i^2 a_{n-i} \quad (2)$$

where $h_i^1$: impulse response at time i at the diversity path 10a,
$h_i^2$: impulse response at time i at the diversity path 10b,
$a_{n-i}$: data transmitted at time (n-i).

The complex multiplier 18a controls the level/phase of the data or signal $r_n^1$ using a weighting coefficient $w_1$ applied thereto from the correlator 20a. In a similar manner, the complex multiplier 18b controls the level/phase of the data $r_n^2$ using a weighting coefficient $w_2$ applied thereto from the correlator 20b.

As mentioned above, the outputs of the multipliers 18a and 18b are applied to the combiner 22. Designating the data combined at the combiner 22 as $y_n$, we obtain the following equation (3).

$$\begin{aligned} y_n &= r_n^1 w_1 + r_n^1 w_2 \\ &= w_1 \left(\sum h_i^1 a_{n-i}\right) + w_2 \left(\sum h_i^2 a_{n-i}\right) \\ &= \sum \{(w_1 h_i^1 + w_2 h_i^2) a_{n-i}\} \end{aligned} \quad (3)$$

In equation (3), the value of $(w_1 h_i^1 + w_2 h_i^2)$ can be set to unity (viz., 1) because each of the weight coefficients $w_1$ and $w_2$ is generated by correlating the output of the AGC amplifier 24, whose level has been normalized at the AGC amplifier 24, with the incoming data. Therefore, the equation (3) can be simplified as follows.

$$y_n = \Sigma a_{n-i} \quad (4)$$

On the other hand, the weight coefficients $w_1$ and $w_2$ are represented by $$\begin{aligned} w_1 &= E[r_n^{1*} y_n] \\ &= E\left[\sum h_i^{1*} a_{n-i}^* a_{n-i}\right] \\ &= \sum h_i^{1*} \quad (\because E[\sum a_{n-i}^* a_{n-i}] = 1) \end{aligned} \quad (5)$$

where * indicates complex conjugate, and the symbol E indicates an evaluation function.

Therefore, the following equation is obtained from equations (3) and (5).

$$y_n = \Sigma(h_i^{1*} \cdot h_i^1 + h_i^{2*} \cdot h_i^2) a_{n-1} \quad (6)$$

In equation (6), the parenthesized portion indicates multiplication of complex conjugate numbers. In other words, equation (6) represents the power-two combination, viz., the maximum ratio combination.

The combiner 22 is well known in the art and hence, a further detailed description thereof will be omitted for brevity.

With the maximum-ratio combining, if the data $r_n^2$ on the diversity path 10b has a level higher than the data $r_n^1$ on the other diverty path 10a, the weight coefficient $w_2$ becomes larger than $w_1$, and vice versa. That is to say, the combiner 22 operates such as to maximize a signal-to-noise ratio (S/N) of the signal with the higher level. This is the feature of the combining technique.

However, the combiner 22 has suffered from the following difficulty. That is, assuming that the incoming data or signal $r_n^2$ has been contaminated by an interfering signal such as to exhibit a level higher than the other incoming data $r_n^1$ (assuming that $r_n^1$ is a desired signal). In such a case, the combiner 22 operates such as to maximize a signal-to-noise ratio (S/N) in connection with the signal having a higher level (viz., the contaminated signal $r_n^2$ in this instance). In other words, the maximum-ratio combining is undesirably not carried out on the desired signal $r_n^1$ but on the interfered signal $r_n^2$. Summing up, combiner 22 implements diversity combination with respect to the signal with a higher level irrespective of whether this signal is a desired signal or an interfered signal.

SUMMARY OF THE INVENTION

It is therefore an object of the present invention to provide an apparatus for implementing maximum-ratio combining on a desired signal even if this signal has a level lower than another diversity path's signal whose level becomes higher, due to interfering during transmission, than the desired signal.

Another object of the present invention is to provide a method of implementing maximum-ratio combining on a desired signal even if this signal has a level lower than another diversity path's signal whose level becomes higher, due to interfering during transmission, than the desired signal.

These objects are fulfilled by improved techniques wherein a pilot signal is generated and added to a modulated carrier in a transmitter. The pilot signal is identical to an unmodulated carrier and has a level higher than a modulated signal to be transmitted. The pilot signal, transmitted together with the modulated carrier, is extracted at a diversity receiver and is correlated with the transmitted signals appearing at a plurality of diversity paths in the receiver in order to generate respective correlation coefficients. Subsequently, the received signals are respectively compensated for, using the correlation coefficients, in terms of levels and phases and then applied to a combiner. The pilot signal included in the output of the combiner is removed before the output of the combiner is demodulated.

One aspect of the present invention resides in a radio communication system including a transmitter and a receiver, the receiver comprising: a plurality of diversity antennas; a plurality of signal distortion compensators for compensating distortion of incoming signals, respectively derived from the plurality of diversity antennas, by correlating each of the incoming signals with a reference signal; band-pass filter means, coupled to receive at least one of the incoming signals, for extracting pilot information inserted into a data signal radiated from the transmitter, the pilot information being generated using a carrier in the transmitter and having a level higher than a level of the data signal; reference signal generating means, coupled to receive an output of the band-pass filter means, for generating the reference signal after implementing gain control on the pilot information, the reference signal being applied to the plurality of signal distortion compensators; combiner, coupled to receive outputs of the plurality of signal distortion compensators, for improving a signal-to-noise ratio of a desired incoming signal; and means, coupled to the combiner, for removing the pilot information.

Another aspect of the present invention resides in a diversity reception method in a radio communication system which includes a transmitter and a receiver, comprising the steps of: (a) receiving a signal transmitted at a plurality of diversity antennas; (b) compensating distortion of incoming signals, respectively derived from the plurality of diversity antennas, by correlating each of the incoming signals with a reference signal; (c) receiving at least one of the incoming signals, and extracting pilot information inserted into a data signal radiated from the transmitter, the pilot information being generated using a carrier in the transmitter and having a level higher than a level of the data signal; (d) receiving an output of the band-pass filter means, and generating the reference signal after implementing gain control on the pilot information, the reference signal being used at step (b); (e) receiving outputs of the plurality of signal distortion compensators, and improving a signal-to-noise ratio of a desired incoming signal; and (f) receiving an output of the combiner, and removing the pilot information.

BRIEF DESCRIPTION OF THE DRAWINGS

The feature and advantages of the present invention will become more clearly appreciated from the following description taken in conduction with the accompanying drawings in which like members or elements are denoted by like reference numerals and in which.

DETAILED DESCRIPTION OF THE PREFERRED EMBODIMENTS

A first embodiment of the present invention will be described with reference to FIGS. 2–6.

Figure 2:
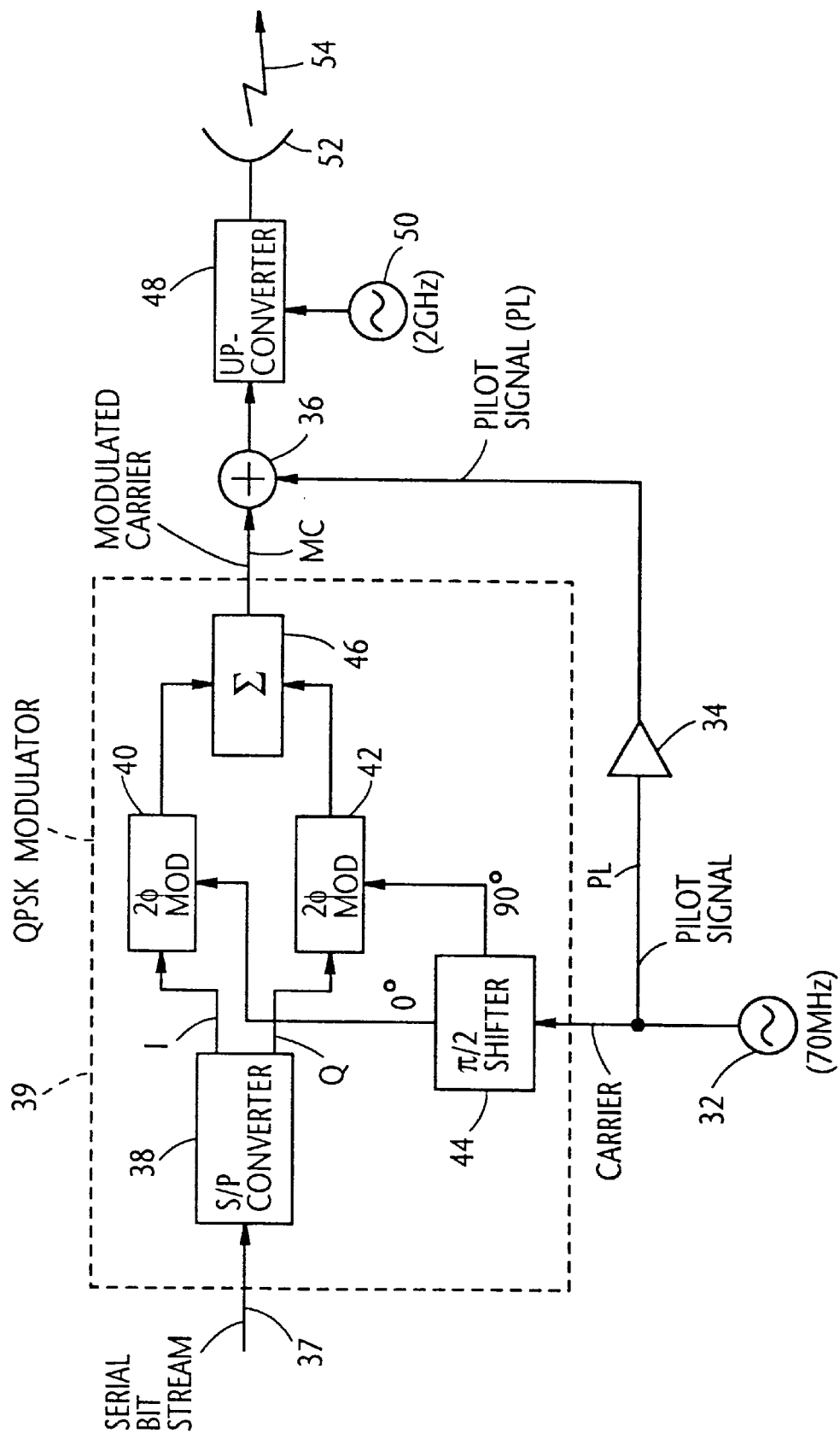
FIG. 2 is a block diagram schematically showing a transmitter to which the present invention is applicable and which embodies the present invention.

FIG. 2 schematically shows, in block diagram form, a high-frequency radio transmitter to which the present invention is applicable. As shown in FIG. 2, a pilot signal depicted by PL is derived from a local oscillator 32, amplified at a suitable amplifier 34 such as to become higher than that of a modulated carrier (depicted by MC), and added to the modulated carrier MC at an adder 36. It is understood from the drawing that the pilot signal PL is identical to a carrier generated from the local oscillator 32. The frequency of the carrier (viz., pilot signal PL) is 70 MHz merely by way of example. The remaining arrangement of FIG. 2 is well known in the art and hence only a brief description thereof will be given for brevity.

A serial bit stream 37 is applied to a serial-to-parallel (S/P) converter 38, which forms part of a QPSK (quadrature phase shift keying) modulator 39 and which divides the serial bit stream 37 into two components for I and Q (viz., in-phase and quadrature) inputs to 2-phase modulators 40 and 42, respectively. The local oscillator 32 applies the carrier to a $\pi/2$ phase-shifter 44. This phase shifter 44 applies a non-phase-shifted signal to the 2-phase modulator 40 while applying a $\pi/2$ phase-shifted signal to the 2-phase modulator 42. The outputs of the modulators 40 and 42 are combined at a combiner 46 and then applied to the adder 36 wherein the pilot signal PL is added to the modulated carrier MC, as stated above.

An up-converter 48 translates the output of the adder 36 to an operating frequency of the terminal using an up-conversion local oscillator 50 whose oscillation frequency is 2 GHz (for example). The output of the up-converter 48 is then amplified at an appropriate amplifier (not shown) to a desired level and then fed to an antenna 52 for radiation to a distant end. The radiated signal is depicted by numeral 54.

Figure 3:
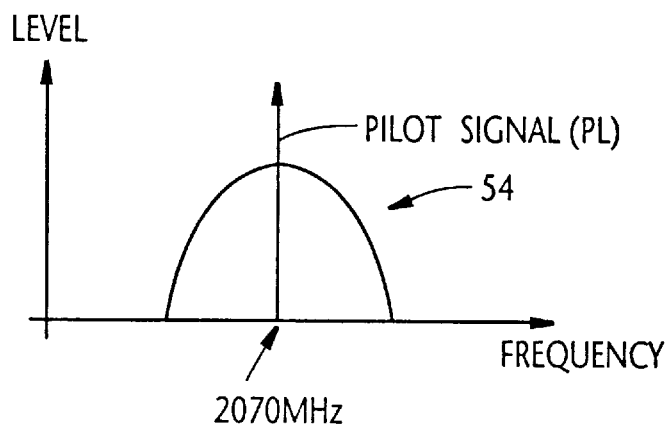
FIG. 3 is a sketch schematically showing a frequency spectrum of a signal radiated from the transmitter of FIG. 2.
Figure 5:
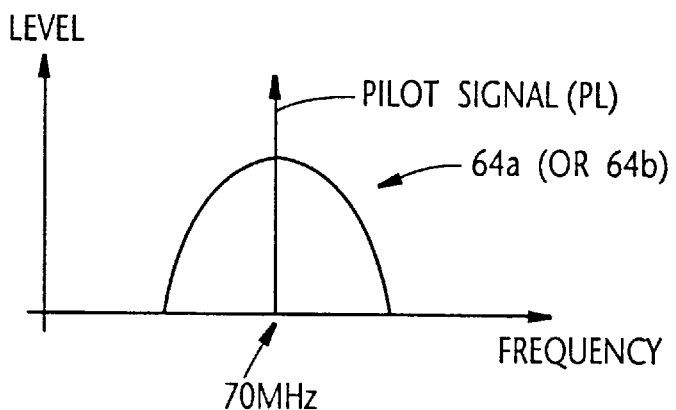
FIG. 5 is a sketch schematically showing a frequency spectrum of an IF signal appearing in the arrangement of FIG. 4.

FIG. 3 is a sketch schematically showing a frequency spectrum of the signal 54 transmitted from the antenna 52 (FIG. 2). It is to be noted that the pilot signal PL is located at a frequency 2070 MHz (=2 GHz+70 MHz). The signal 54 distributes over a frequency range, for example, from 2065 MHz to 2075 MHz. However, the bandwidth of the signal 54 is irrelevant to the present invention.

Figure 4:
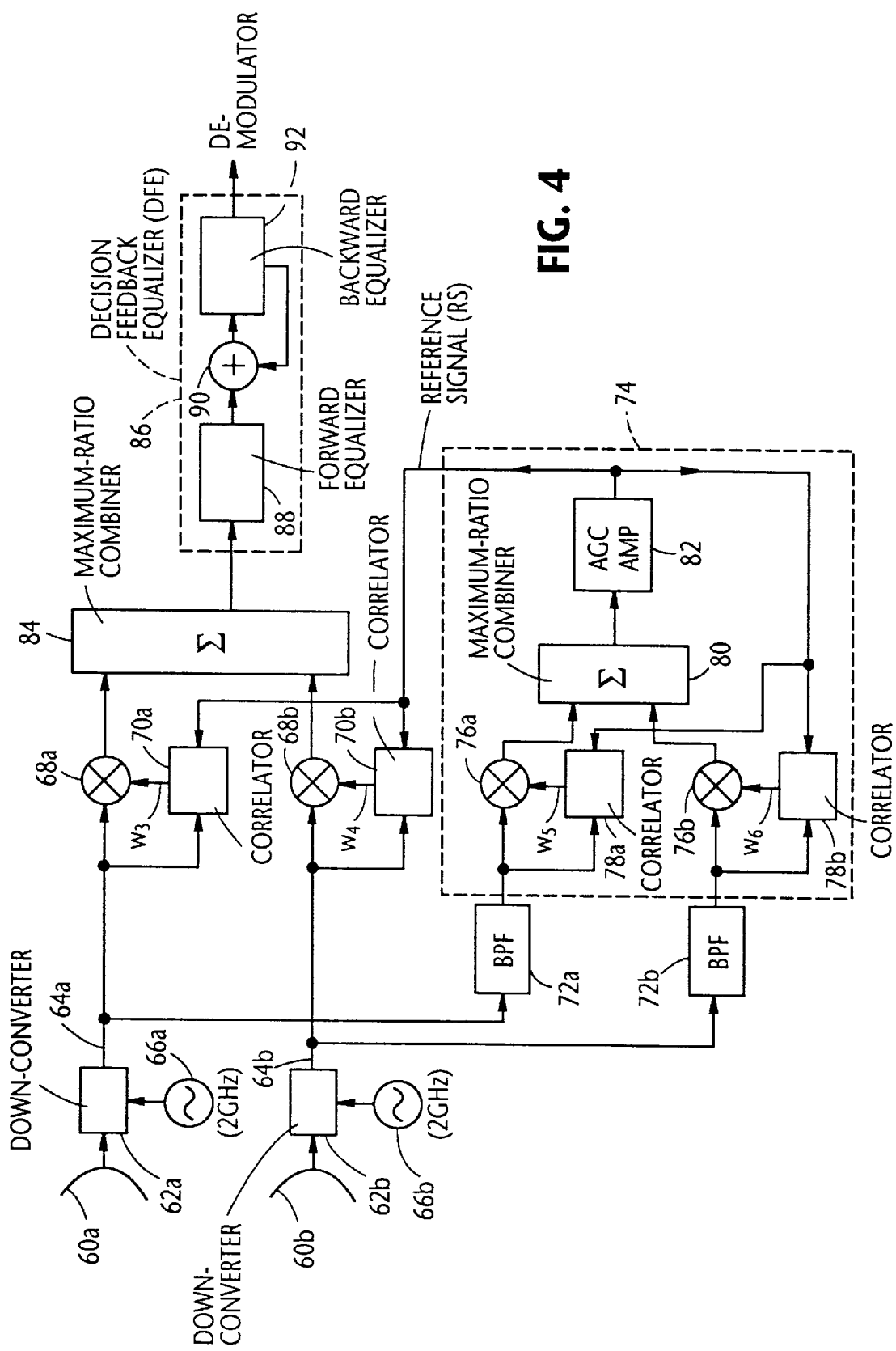
FIG. 4 is a block diagram showing a front portion of a diversity receiver according to a first embodiment of the present invention.

FIG. 4 is a block diagram showing a front portion of a diversity receiver according to a first embodiment of the present invention.

As shown in FIG. 4, two antennas 60a and 60b respectively receive the signal 54 transmitted from the transmitter of FIG. 2 over separate transmission paths, and respectively apply the received signals to down-converters 62a and 62b. The down-converter 62a translates the incoming signal to a predetermined IF signal 84a using a local oscillator 66a whose oscillation frequency is 2 GHz. The output of the down-converter 62a is fed to a complex multiplier 68a, a correlator 70a, and a band-pass-filter 72a. In a similar manner, the other down-converter 62b translates the incoming signal to an IF signal 64b using a local oscillator 66b whose oscillation frequency is 2 GHz. The output of the down-converter 62b is applied to a complex multiplier 68b, a correlator 70b, and a band-pass-filter 72b.

Each of the correlators 70a and 70b operates such as to correlate the corresponding IF signal (64a or 64b) with a reference signal (depicted by RS) applied thereto from a reference signal generator 74 which is further described later. Following this, the correlators 70a and 70b respectively issue weighting coefficients $w_3$ and $w_4$ which are respectively applied to the multipliers 88a and 88b. Thus, the levels and phases of the IF signals 64a and 64b are respectively controlled or regulated at the multipliers 68a and 68b. The operations of the correlators 70a–70b and the multipliers 68a–68b are substantially identical to those of the counterparts of FIG. 1 and are well known in the art, so that further descriptions thereof are redundant and accordingly omitted for simplifying the disclosure.

Figure 6:
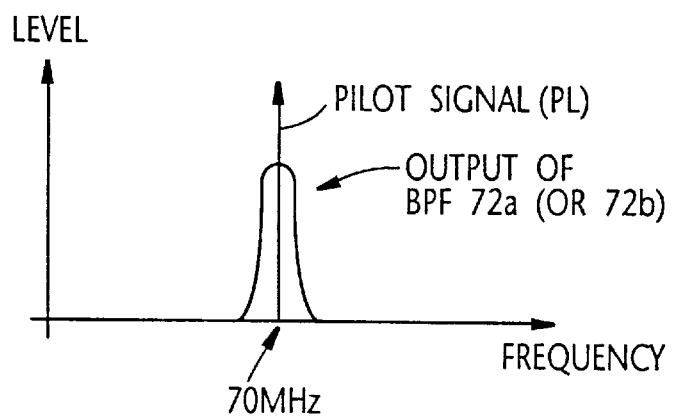
FIG. 6 is a sketch schematically showing a frequency spectrum of an output of a band-pass filter used in the arrangement of FIG. 4.

Each of the band-pass filters 72a and 72b has a narrow pass band whose center frequency is set to 70 MHz and thus, allows the narrow sidebands on either side of the pilot signal PL to pass therethrough as schematically sketched in FIG. 6.

Figure 1:
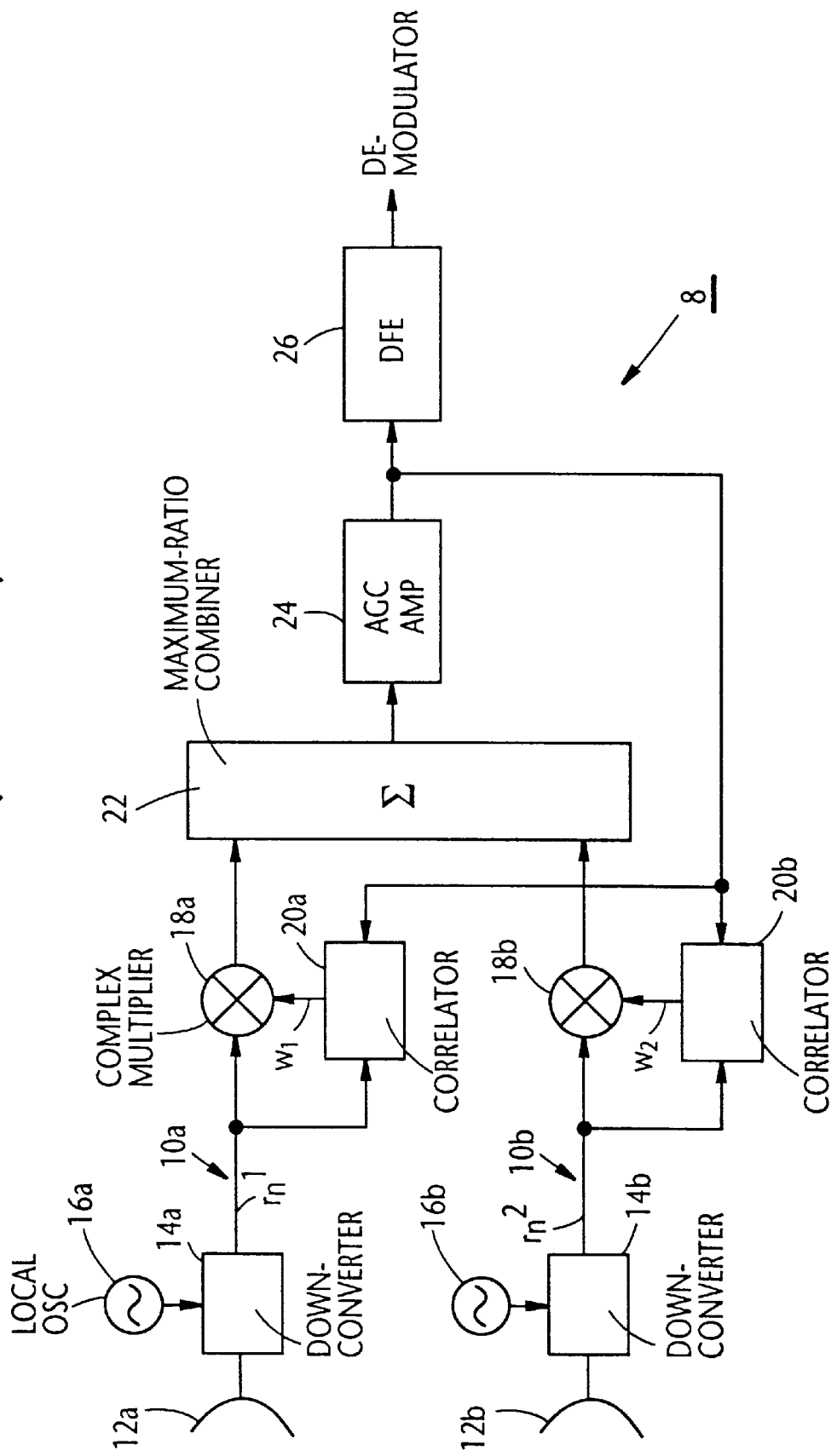
FIG. 1 is a block diagram showing a front portion of a conventional diversity receiver, having been referred to in the opening paragraphs of the instant disclosure.

As shown in FIG. 4, the reference signal generator 74 comprises a plurality of functional blocks 76a, 76b, 78a, 78b, 80, and 82, which respectively correspond to the functional blocks 18a, 18b, 20a, 20b, 22, and 24 of FIG. 1. These blocks of FIG. 1 have been specifically described and accordingly, it may be sufficient for understanding the present invention if the reference signal generator 74 is briefly discussed. It is to be noted, however, that the reference signal generator 74 is supplied with the outputs of the of the bandpass filters 72a and 72b, each of which includes the pilot signal PL.

The band-pass filter 72a applies the output thereof to the multiplexer 76a and the correlator 78a. In a similar manner, the band-pass filter 72b applies the output thereof to the multiplexer 76b and the correlator 78b. The correlator 78a correlates the outputs of the band-pass filter 72a and the AGC amplifier 82, and issues a weighting coefficient $w_5$ using the correlation result. Likewise, the correlator 78b correlates the outputs of the band-pass filter 72b and the AGC amplifier 82, and issues a weighting coefficient $w_6$ using the correlation result. The multiplier 76a controls the level/phase of the output of the band-pass filter 72a using the weighting coefficient $w_5$, while the multiplier 76b controls the level/phase of the output of the band-pass filter 72b using the weighting coefficient $w_6$.

The combiner 82 receives the outputs of the multipliers 76a and 76b, and improves the signal-to-noise ratio in connection with one of the two pilot signals PL, which has the higher level. As mentioned above, the pilot signal PL radiated from the transmitter of FIG. 2 has a level higher than the transmitting data signal.

Turning to the operations of the correlators 70a and 70b. It is assumed that: (a) the IF signal 64b has been interfered with (or contaminated by) an adjacent channel signal (for example) and exhibits a level higher than the IF signal 64a and (b) the IF signal 64a has a lower level, but it has not been subjected to signal interference. Further assuming that the peak level of the IF signal 64b is located away from the pilot signal PL. This means that the IF signal 64b exhibits low similarity to the reference signal RF at the correlator 70b. Contrarily, although the IF signal 64a has a lower level, the IF signal 64a is highly correlated with the reference signal RF. As a result, the weight coefficient (viz., correlation coefficient) $w_4$ is rapidly lowered, while the other coefficient $w_3$ increases in a very short time duration. Thus, it is understood that the combiner 84 operates such as to improve a signal-to-noise ratio of the IF signal 64*a*.

The output of the combiner 84 includes the pilot signal PL and therefore, it is necessary to remove this signal before the output of the combiner 84 is applied to a demodulator (not shown). To this end, a known decision feedback equalizer (DFE) 86 is provided which immediately follows the combiner 84. The DFE 86 was disclosed in a paper entitled "Cancellation of CW interference by Decision Feedback Equalizer in Multipath Channel" by Ichiro TSUJIMOTO, at the Spring Secession held by the Japanese Association of Electronics and Information on 1992. As shown, the DFE 86 comprises a forward equalizer 88, and adder 90, and a backward equalizer 92. Although not illustrated in FIG. 4, a reference tap of the DFE 86 is located at a center tap of the forward equalizer 88 and thus, the forward equalizer 88 functions as a notch filter. If the notch filter's frequency is adjusted to 70 MHz in this particular case, the pilot signal PL can be removed at the forward equalizer 88. The signal distortion of the desired signal due to the notch filter can be compensated at the backward equalizer 92. In addition to the cancellation of the pilot signal PL, the DFE 86 implements the normal operation of equalizing waveform distortion caused by multipath fading.

Figure 7:
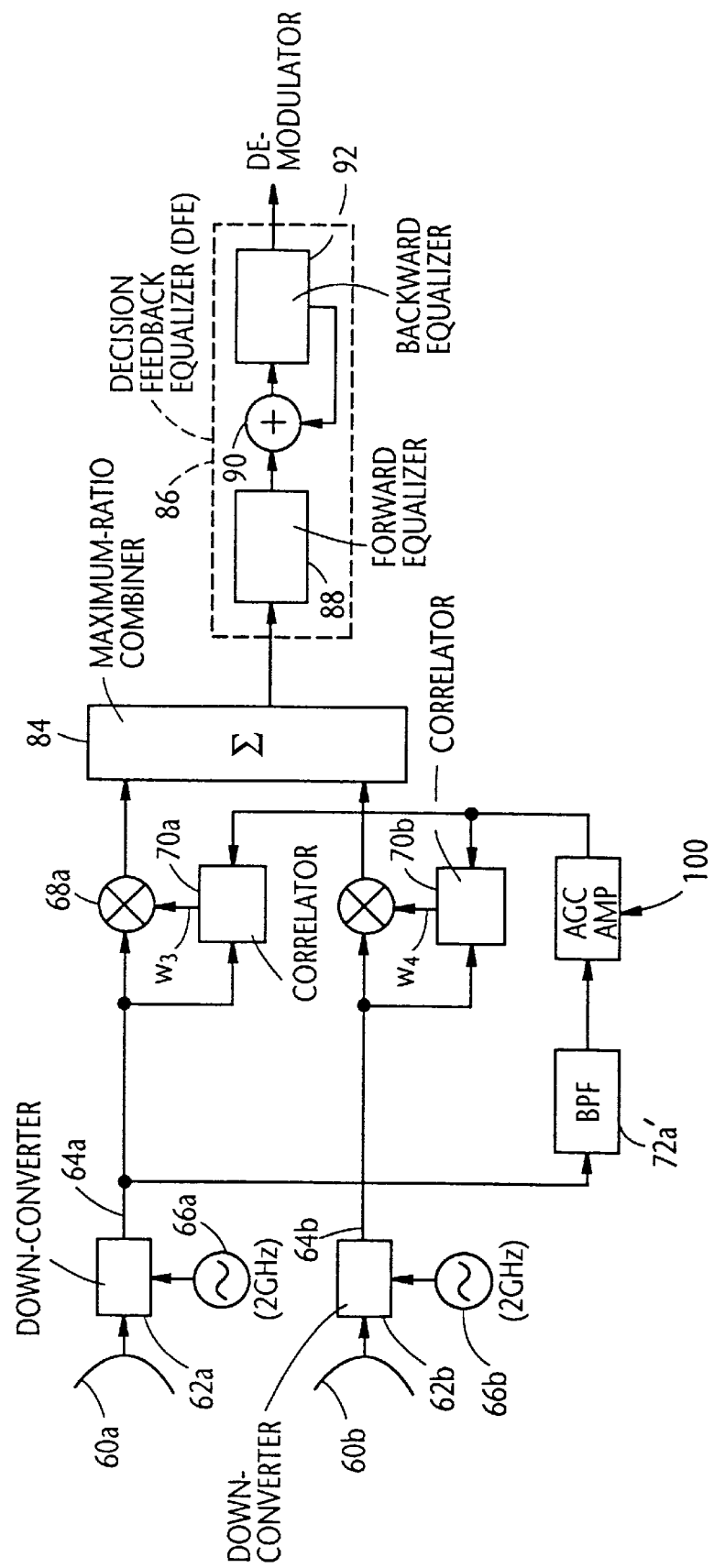
FIG. 7 is a block diagram showing a front portion of a diversity receiver according to a second embodiment of the present invention.

FIG. 7 is a block diagram showing a second embodiment of the present invention. The arrangement of FIG. 7 differs from that of FIG. 4 in that the former arrangement includes a band-pass filter 72*a*' and an AGC amplifier 100 instead of the band-pass filters 72*a*–72*b* and the reference signal generator 74 of FIG. 4. Other than this, the second embodiment is identical to the first one.

The band-pass filter 72*a*' extracts the pilot signal PL as in the first embodiment. Subsequently, the level of the pilot signal PL is normalized at the AGC amplifier 100 and is sent to the correlators 70*a* and 70*b*. It is understood that the second embodiment is able to attain the same purpose as the first embodiment with a simpler circuit configuration.

In the above, discussion, although only two diversity paths are provided in each of the first and second embodiments, the number of diversity paths is in no way limited to two (2) and can be increased to more than two. Further, in the second embodiment, the single band-pass filter can be arranged such as to receive the output of the down-converter 62*b* instead of 62*a*.

It will be understood that the above disclosure is representative of only two possible embodiments of the present invention and that the concept on which the invention is based is not specifically limited thereto.

What is claimed:

1. A radio communication system including a transmitter and a receiver, said receiver comprising:

a plurality of diversity antennas;

a plurality of signal distortion compensators for compensating distortion of incoming signals, respectively derived from said plurality of diversity antennas, by correlating each of said incoming signals with a reference signal;

band-pass filter means, coupled to receive at least one of said incoming signals, for extracting pilot information inserted into a data signal radiated from said transmitter, said pilot information being generated using a carrier in said transmitter and having a level higher than a level of said data signal;

reference signal generating means, coupled to receive an output of said band-pass filter means, for generating said reference signal after implementing gain control on said pilot information, said reference signal being applied to said plurality of signal distortion compensators;

a maximum-ratio combiner, coupled to receive outputs of said plurality of signal distortion compensators, for improving a signal-to-noise ratio of a desired incoming signal; and means, coupled to said maximum-ratio combiner, for removing said pilot information.

2. A radio communication system as claimed in claim 1, wherein said band-pass filter means includes a plurality of band-pass filters which respectively receive said incoming signals and which respectively extract said pilot information included in said incoming signals.

3. A radio communication system as claimed in claim 2, wherein said reference signal generating means comprises:

a plurality of another signal distortion compensators, respectively coupled to said plurality of band-pass filters, for compensating distortion of outputs of said plurality of band-pass filters by correlating each of said outputs with said reference signal;

another maximum-ratio combiner, coupled to receive outputs of said plurality of another signal distortion compensators, for improving a signal-to-noise ratio of desired pilot information; and an automatic gain controller coupled to adjust a gain of an output of said another maximum-ratio combiner, said automatic gain controller generating said reference signal.

4. A diversity reception method in a radio communication system which includes a transmitter and a receiver, comprising the steps of:

(a) receiving a signal transmitted at a plurality of diversity antennas;

(b) compensating distortion of incoming signals, respectively derived from said plurality of diversity antennas, by correlating each of said incoming signals with a reference signal;

(c) receiving at least one of said incoming signals, and extracting pilot information inserted into a data signal radiated from said transmitter, said pilot information being generated using a carrier in said transmitter and having a level higher than a level of said data signal;

(d) receiving said pilot information extracted in step (c), and generating said reference signal after implementing gain control on said pilot information, said reference signal being used at step (b);

(e) receiving, at a maximum-ratio combiner, the distortion-compensated incoming signals obtained from step (b), and improving a signal-to-noise ratio of a desired incoming signal; and (f) receiving an output of said maximum-ratio combiner, and removing said pilot information.

5. A radio communication system including a transmitter and a receiver, said receiver comprising:

a plurality of diversity antennas;

signal processing means for processing, using maximum-ratio combining techniques, incoming signals respectively derived from said plurality of diversity antennas, said signal processing means compensating for distortion of the incoming signals by correlating each of said incoming signals with a reference signal, said signal processing means further operating such as to improve a signal-to-noise ratio of a desired incoming signal;

a pilot information extractor, coupled to receive at least one of said incoming signals, for extracting pilot information inserted into a data signal radiated from said transmitter, said pilot information being generated using a carrier in said transmitter and having a level higher than a level of said data signal;

a reference signal generator, coupled to receive an output of said pilot information extractor, for generating said reference signal after implementing gain control on said pilot information, said reference signal being applied to said signal processing means; and pilot information removing means, coupled to said signal processing means, for removing said pilot information.

6. A radio communication system as claimed in claim 5, wherein said pilot information extractor is a band-pass filter coupled to receive an incoming signal derived from one of said plurality of diversity antennas.

7. A radio communication system a claimed in claim 5, wherein said pilot information extractor comprises a plurality of band-pass filters which respectively receive said incoming signals and which respectively extract said pilot information included in said incoming signals.

8. A radio communication system as claimed in claim 7, wherein said reference signal generator comprises:

another signal processing means for processing outputs of said plurality of band-pass filters using maximum-ratio combining techniques, said another signal processing means compensating for distortion of the outputs of said plurality of band-pass filters by correlating each of said output of said plurality of band-pass filters with said reference signal, said another signal processing means further operating such as to improve a signal-to-noise ratio of desired incoming pilot information.

* * * * *